UNITED STATES PATENT OFFICE.

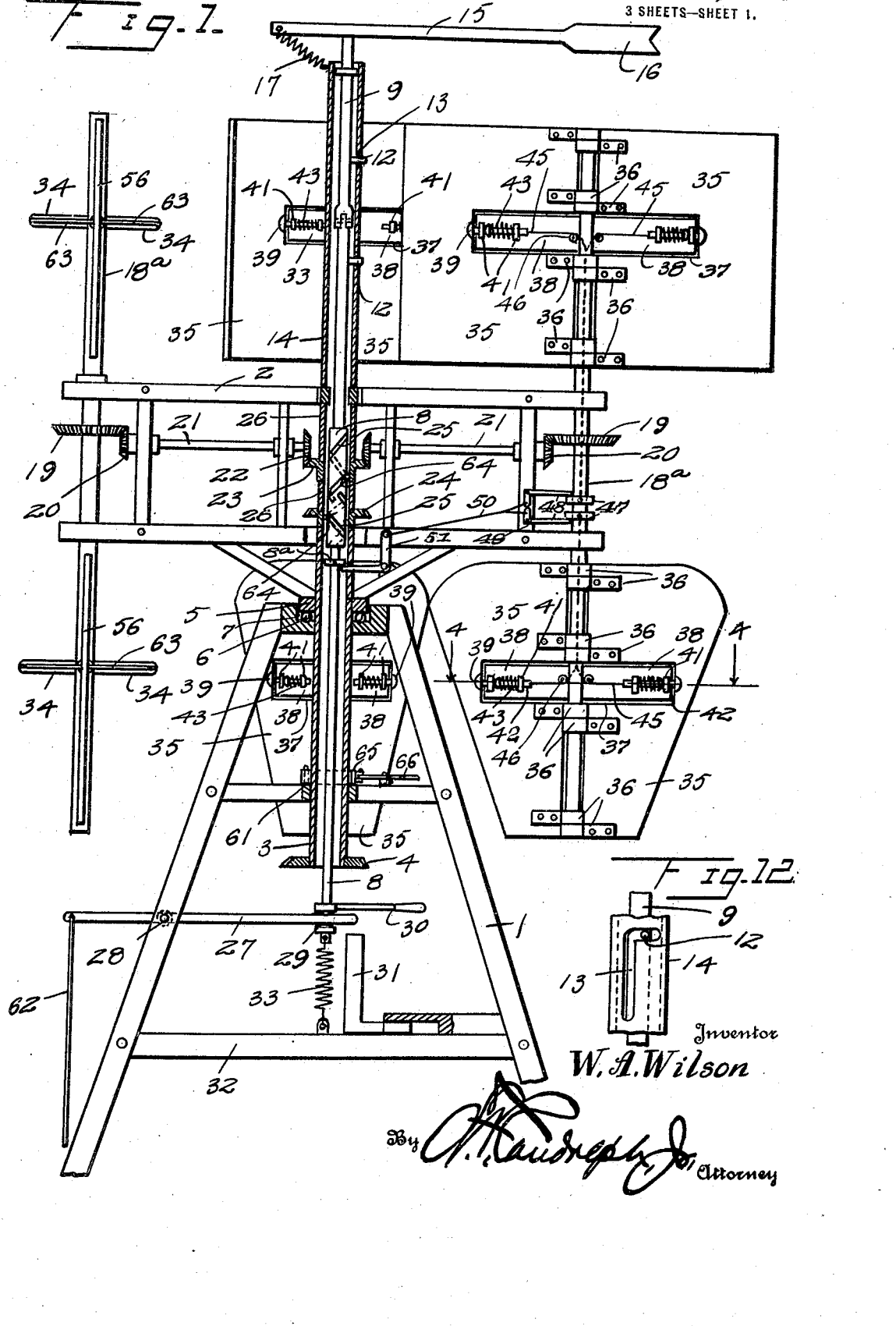

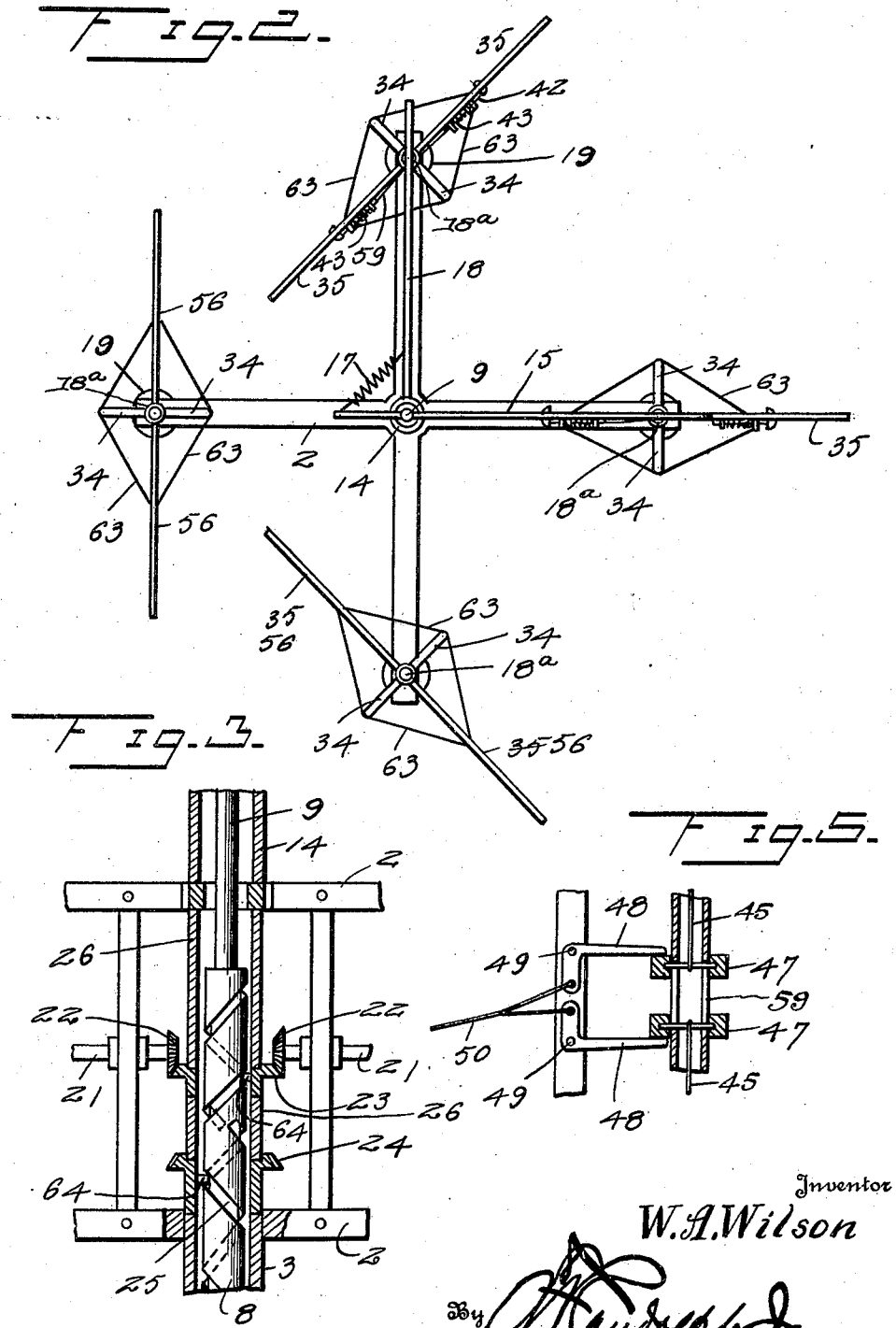

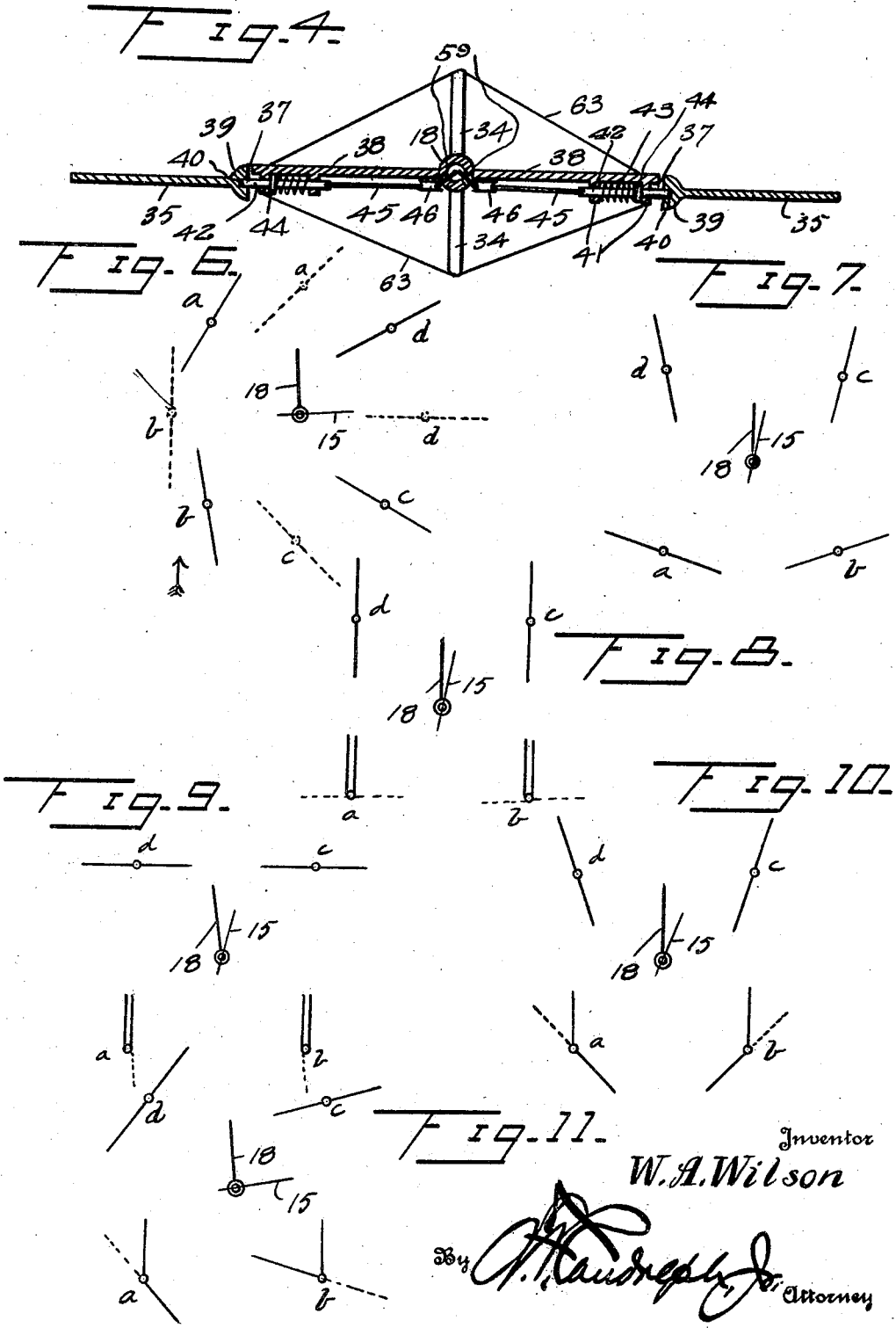

WALTER A. WILSON, OF ELKHART, KANSAS.

WINDMILL.

1,419,000.  Specification of Letters Patent.  Patented June 6, 1922.

Application filed March 16, 1921. Serial No. 452,883.

*To all whom it may concern:*

Be it known that I, WALTER A. WILSON, a citizen of the United States, residing at Elkhart, in the county of Morton and State of Kansas, have invented certain new and useful Improvements in Windmills; and I do hereby declare the following to be a full, clear, and exact description of the invention, such as will enable others skilled in the art to which it appertains to make and use the same.

This invention relates to certain new and useful improvements in windmills of the type disclosed in Letters Patent No. 1,352,859 granted to me on Sept. 24, 1920.

One object of the invention is to provide a windmill of the horizontal, high power type having two collapsible vanes and two non-collapsible vanes and having means adapted to be actuated by the excessive air current when the vanes are driven above a predetermined rate of speed to move the non-collapsible vanes into position parallel with the direction of the air current and to move the collapsible vanes into position intersecting the path of movement of the air current and at the same time to relieve the sections of the said collapsible vanes whereby to prevent the revolution of the windmill by an air current of such high velocity as would be liable to cause damage to the windmill.

A further object is to provide a windmill of the type stated which may be readily mounted for operation and which will be of such construction that the governing device will operate upon excessive increases in the velocity of the air current to release the collapsible vanes and turn the other vanes into inoperative position parallel with the direction of travel of the air current so that the operation of the windmill will be automatically and instantly arrested to prevent damage to any of the parts thereof.

A still further object is to provide a windmill of the character stated which when in the inoperative position all large exposed surfaces or vanes are disposed with reference to the wind entirely on the lee side from their fulcrums so that a sudden change in the angle of the air current does not subject these vanes to sudden pressure but instantly swings them parallel to the air current to prevent wrecking of the tower during storms.

Another object is to provide a windmill of the character stated in which a pair of rudder members constituting a wind pressing governor may be employed with the members carried by the main stem or shaft of the windmill so as to automatically control the speed of the windmill and also automatically turn all of these vanes entirely out of the wind during storm, and in such position that their whole surface is to the lee side of their fulcrums.

Still another object is to provide a simple and improved form of pressure regulator for automatically controlling the speed of operation of the windmill and also for automatically discontinuing operation of the windmill upon increase of the air current above a predetermined velocity.

One more object is to provide a windmill of the character stated which will be of simple and improved construction and operation and comparatively inexpensive.

With the foregoing and other objects in view as will appear as the description proceeds, the invention consists in the novel construction combination and arrangement of cooperating elements as hereinafter more specifically set forth, shown in the drawings and pointed out in the appended claims.

In the drawings forming a part of the present application and in which similar reference characters designate corresponding parts throughout the several views;

Figure 1 is a view of the windmill with the parts substantially in central vertical section.

Figure 2 is a plan view of the windmill.

Figure 3 is an enlarged vertical section through the center of the revolving platform and the vane revolving mechanism at the center of the platform.

Figure 4 is an enlarged transverse sectional view on the plane of line 4—4 of Figure 1, showing the parts of the vane collapsing mechanism on an enlarged scale.

Figure 5 is a detail sectional view of the relay levers at 60 in Figure 1.

Figure 6 is a top diagrammatical illustration of the successive positions and relations of the vanes as they revolve around the tower in operation.

Figure 7 is a diagrammatical illustration of the position and relation of the vanes when the pressure governor has operated to bring the windmill to a standstill in high wind.

Figure 8 is another diagrammatical view of the position and relation of the vanes when the pressure governor has operated to bring the center stem in position for causing the collapsible vanes to be released and collapse for protection from whipping storms.

Figures 9, 10 and 11 show the successive steps and relations of vanes as the mill is being set in operation.

Figure 12 is a fragmentary view of sleeve 14 of Figure 1 where the slot in the sleeve supports the central shaft.

Referring more in detail to the drawings in which similar reference characters designate corresponding parts throughout the several views, 1 indicates in general the tower structure upon which a platform 2 is mounted for rotation. A hollow depending drive shaft 3 is carried by the platform 2 and projects downwardly into the upper portion of the tower 1, as clearly shown in the Figure 1 of the drawings. An external gear wheel 4 is carried on the lower end of the shaft 3. A bearing collar 5 is mounted on bearing balls 6 in a recess 7 provided for the collar 5. A lower babbit bearing 61 steadies the drive shaft.

The longitudinally slidable shaft or stem 8 of the windmill extends through the hollow drive shaft 3 and depends below the same. A spring 33 is connected at one end to the lower extremity of the longitudinally slidable shaft or stem 8 while the opposite end of the spring is connected a suitable part of the tower 1. This longitudinally slidable shaft or stem 8 extends above the platform 2 and into an upstanding sleeve 14 which rests upon the top of the platform 2. The upper end of this stem 8 is flattened on the sides as to fit into a socket in the end of a second stem 9 which extends above the upper end of sleeve 14. An arm 15 extends horizontally from the upper portion of this stem 9 and has an arrow shaped head 16 on its outer end, whereby said arm may serve as one member of a governor mechanism for controlling the speed of rotation of the platform 2 and the parts carried thereby. A second arm 18 of the governor mechanism projects from the upper portion of the sleeve 14 with an arrow shaped head at its outer end and this member serves as the rudder for the windmill. The arm 15 of the governor mechanism is extended across the top of the sleeve 14 and is connected with the rudder arm 18 by means of a spring 17 as shown in Figure 2. This spring 17 serves to normally retain the arm 15 in position at an angle to the arm 18. The rudder arm 18 will be at all times turned in the direction of the strong air current tending to cause operation of the windmill while the arm 15 will extend at substantially a right angle to the path of the air current so that when this current increases in velocity to such a degree as to overcome the resistance offered by the spring 17 the arm 15 will be caused to swing toward the arm 18, thereby turning the stems 9 which turn stem 8 and gears 23 and 24, causing the vanes to assume more the positions illustrated in Figure 7 so they will rotate more slowly, thus governing the speed. Near the upper end of stem 8 is a projection 12 which extends into a hole or slot in the sleeve 14 as shown in Figure 1 and Figure 12. When the stem 8 is twisted around to such an extent that this projection 12 extends out into the horizontal portion of slot 13 as in Figure 12, when it reaches the vertical portion of said slot 13 the stem 8 is drawn by spring 33 to a lower position so as to arrest further operation of the windmill, as will be later clearly understood. A similar projection and slot serve to retain stem 9 in its folded position when the mill is out of operation.

The platform 2 includes four arms directed at right angles to one another and in each arm of which is mounted a vertical double vane carrying shaft 18ᵃ which has a beveled gear 19 or the like mounted thereon between the upper and lower portions of the platform 2. A beveled gear 20 carried on the outer ends of a horizontal shaft 21 is provided for each gear 19. The shafts 21 extend longitudinally in the arms of the platform 2 and have bevel gears 22 on their inner ends in mesh with bevel gears 23 and 24. The gears 23 and 24 are held in their proper positions against vertical movement sleeves 26 between them and the upper and lower parts of platform 2. Projections or lugs 64 on the inside of the gears 23 and 24 ride in spiral grooves in the stem 8, one grooves 25 running in a clockwise direction along the stem 8 and the other in a counter clockwise direction. A return lever 27 is attached to the tower 1, as at 28 and has a hole through which the shaft 8 extends and is held in place on this shaft by collar 29 and lever arm 30 attached to stem 8. This arm 30 is used to turn the stem 8 to the position where the mill will become inoperative when it is desired to stop it. A raising cable 62 depends from the outer end of the lever 27, by means of which the stem may be readily returned to its upper or operative position against the action of the spring 33. The grooves 25 in stem 8 extend farther along the stem than is necessary to bring the mill to a stop and the post 31 can be slid out of the way so the stem 8 can be further lowered for the purpose of connecting up the collapsible vanes as will be fully explained further on.

Each shaft 18ᵃ has the vanes on its upper and lower ends, as described and the vanes are positioned as shown in Figure 2 for operation. Two of the shafts 21 have the inner gears 22 thereof meshing with the gear 23 as shown in Figure 1 while the gears 22 of the remaining shafts 21 mesh with the central gear 24. On two adjacent shafts 18ª, are mounted the rigid or non-collapsible vanes 56, which extend in opposite directions from the upper and lower portions of the shafts and the halves of the vane on these shafts being connected by flexible bracing cords 63 as seen in Figure 2 connecting the same on opposite sides and extending across bracing members 34. The vanes mounted on the upper and lower ends of the remaining shafts 18ª are collapsible. The upper and lower sections of these vanes are each formed in two parts, which may be designated by the numeral 35 and these parts 35 are provided with a plurality of hinged straps 36 which are rotatably mounted on the shafts 18ª, the hinged strap members 36 project from the inner edges of the parts 35. Each part 35 has a slot 37 extended therein from the inner end thereof toward the outer edge thereof and a latch plate 38 is positioned within each slot 37 and rigidly mounted on the adjacent shaft 18ª and braced by the cords 63 passing over the posts as in Figure 4. An enlargement or head 39 is formed at the outer end of each portion of the slots 37 and a latch recess or opening 40 is formed therein. The latch plate 38 has a pair of ears 41 projecting from one face thereof near either end and a latch bolt 42 is adapted to have sliding movement through each pair of ears 41. A spring 43 is positioned between the ears 41 of each pair and has one end bearing against one of said ears 41 while its opposite end bears against a collar 44 formed on the latch bolt 42.

The latch bolts 42 have connected to their inner ends the flexible members 45 which pass around guide pulleys 46 and into the hollow shafts 18ª. The flexible members 45 from the upper and lower sections of the collapsible vanes are extended downwardly and upwardly respectively in the hollow shafts 18ª and then connected to one of the normally spaced collars 47 which are slidably mounted on the exterior of the shafts 18. Suitable openings 59 are provided in the shafts 18ª to permit the flexible members 45 to be extended outwardly through the same and connected with the collars 47 as stated. Engaged with the upper and lower faces of the upper and lower collars 47 respectively are the outer ends of the levers 48 which are pivoted upon an upstanding member of the platform 2, as shown at 49. These levers 48 have short right angular arms to which are connected the parts of the bifurcated ends of the flexible member 50. This flexible member 50 is also connected with one arm of a bell crank lever 51 pivoted on one of the upstanding members forming the inner part of the platform 2. The remaining arm of the bell crank lever 51 projects through an opening in the drive shaft 3 and beneath the enlarged portion 8ª on stem 8 so that upon downward movement of the stem 8, the bell crank lever 51 is operated to manipulate the flexible member 50 and then the levers 48 to draw the collars 47 toward one another and release the latch bolts 42 and thereby permit the parts 35 to be thrown inwardly toward one another.

It will be understood that the lower sections of the vanes all have inclined outer edges so that they may readily pass the tower 1.

From the foregoing paragraphs taken in connection with the accompanying drawings, it will be seen that the windmill is constructed in such a manner that the rudder 18 will always be directed rearwardly in the path of the air current by which the windmill is to be operated. The arm 15 forming the other member of the governor mechanism is also normally at an angle to the arm or rudder 18 and extended transversely in the path of the air current. The various vanes of the windmill are also extended as shown in Figures 2 and 6 of the drawings. These vanes may be numbered $a$, $b$, $c$ and $d$. As the vanes move around the stem 8 together with the platform 2 and thereby revolving the latter and the hollow shaft 3 with the gear 4 carried thereby, the gear wheels 22 will ride around the gear wheels 23 and 24, thereby gradually changing the position of the vanes with respect to the arms of the platform 2. As the velocity of the air current is increased to such an extent as to be dangerous to the windmill, movement of the arm 15 of the governor mechanism toward the arm 18 will be caused thus changing the relation of the vanes more toward that shown in Figure 7, thus regulating the speed. As the velocity of the wind still increases the arm 15 carries the stems 8 and 9 around till the projection 12 reaches the vertical part of slot 13 allowing the stem 8 to be drawn downward till it is stopped by post 31. As gear 23 is thus turned in a clockwise direction and gear 24 in a counterclockwise direction it is evident that vanes $a$ and $c$ will be turned so that vane $c$ is parallel to a path of the wind and vane ($a$) is square across the path of wind, while vanes $b$ and $d$ will be turned so that vanes $b$ is across the path of the wind and the vane $d$ is parallel to the path of the wind. At this instant the bell crank lever 51 is released by the downward movement of the stem 8 so as to release the parts 35 of the upper and lower sections of the collapsible vanes $a$ and $b$ as shown in Figure 8.

This will immediately arrest operation of the windmill before damage to the same as it will be seen by reference to Figure 8 that a sudden whipping of the wind in the direction of the shorter arrow cannot result in strain on the windmill as there is no part of any vane in front of the point where it swings to again become parallel to the path of the wind. When it is desired to return the operative parts of the windmill to position for another operation, however it is simply necessary to draw down on the cable 62 and thereby operate the return lever 27 to force the stem 8 upwardly until the projections 12 reach the horizontal parts of the slots 13. The spring 17 will then immediately act to throw the arm 15 away from the arm 68 and by such rotation of the stems 8 and 9 cause a return of the vanes to the operative position shown in Figures 2 and 6. The rudder or arm 15 will also be automatically moved into the path of the air current so that all of the parts will be ready for operation and the vanes positioned at the proper angles with respect to the movement of travel of the air current. When the wind is blowing only slightly so that the two non-collapsible vanes are not sufficient to start the first rotation then the stem is allowed to be drawn still farther down by removing the post 31 so the longer grooves 25 acting on the gears 23 and 24 cause the vanes $d$ and $c$ to turn across the path of the wind and the latch plates belonging to the vanes $a$ and $b$ to swing around parallel to the path of wind so as to catch one wing 35 and when stem 8 is now raised to its operative position the vanes appear as shown in Figure 10 and as arm 15 swings into the path of the wind the vanes take positions as in Figure 11 and commence rotating. When the mill is in operation and it is desired to stop it by hand the arm 30 is turned so that projections 12 enter into the vertical portion of slots 13.

As merely the preferred embodiment of the invention has been shown and described, it will be understood that minor changes in the details of construction and arrangement of parts may be resorted to within the scope of what is claimed without departing from the spirit of the invention.

What is claimed is:—

1. A windmill comprising a tower, a platform rotatable on said tower, a plurality of vane carrying shafts mounted for rotation on said platform, vanes mounted on the opposite ends of said vane carrying shafts, means for rotating said shafts, and means for varying the relative angles of the vanes and permitting collapsing of the vanes on one side of the tower.

2. A windmill comprising a tower, a platform mounted on said tower a hollow shaft depending from said platform and rotatable in said tower, a gear mounted on the hollow shaft, a plurality of non-collapsible vanes rotatably mounted in said platform, a plurality of collapsible vanes mounted rotatably in said platform, and a governor mechanism for said windmill 3. A windmill comprising a tower, a platform rotatably mounted on said tower, a hollow shaft depending from said platform and extended through said tower, a stem extended through said hollow shaft and through said platform, means for releasing the parts of the collapsible vanes to permit collapsing thereof and a governor mechanism connected with the said stem to change the relative angles of the vanes and permit collapsing of the collapsible vanes upon excessive velocity of the air current.

4. A windmill comprising a tower, a platform rotatably mounted on said tower, a hollow shaft depending from said platform and extended through said tower, said platform composed of a pair of arms extended at right angles to one another, vertical shafts mounted in the outer ends of the arm, upper and lower vane members mounted on said shafts, a stem extended through said hollow shaft and mounted on said platform, a sleeve resting upon said platform around said stem, a rudder extended from said sleeve to form one arm of a governor mechanism, a second arm extended from the upper end of the stem above said sleeve and resiliently retained at an angle thereto, said second arm being adapted to be turned toward the said rudder upon increase of the air current above a predetermined velocity so as to turn all vanes in such relation to each other as to arrest operation of the windmill, said sleeve being provided with a downwardly extended slot to receive said second arm from said stems when said second arm is moved toward said rudder and means for moving said stem downwardly to cause a release of sections of certain of said vanes and permit folding thereof in such manner that they are all parallel to travel of the air current and are extended to the rear of their pivotal points.

5. A windmill comprising a tower, a platform mounted on said tower, a depending hollow stem carried by said platform and rotatable through said tower, a stem extended upwardly through said hollow shaft and through said platform, a plurality of collapsible and of non-collapsible vanes rotatable on said platform and with the same, means for changing the relative angles of said vanes at times, and a governing mechanism for said windmill.

6. A windmill comprising a tower, a platform mounted on said tower, a hollow shaft extended from said platform and rotatable in said tower, a sleeve mounted on said platform, a stem extended through said sleeve, an arm extended from said stem, an arm extended from said sleeve, resilient connections between said first mentioned arm and said second mentioned arm, the sleeve having a pair of slots to receive projections from the stem, means for drawing downwardly said stems when the arms are drawn toward one another, and a plurality of collapsible and non-collapsible vanes arranged on said platform so that when collapsed by longitudinal movement of the stem all vanes of the windmill are with reference to the wind extended parallel to and on the lee side from the wind from their pivotal points.

In testimony whereof I affix my signature in presence of two witnesses.

WALTER A. WILSON.

Witnesses:
   Mrs. S. C Baker,
   Mrs. U. B. Terrill.